US007127368B2

(12) United States Patent
Choi

(10) Patent No.: US 7,127,368 B2
(45) Date of Patent: Oct. 24, 2006

(54) ON-CHIP TEMPERATURE SENSOR FOR LOW VOLTAGE OPERATION

(75) Inventor: Kyun Kyu Choi, Seongnam-si (KR)

(73) Assignee: STMicroelectronics Asia Pacific Pte. Ltd., Singapore (SG)

(*) Notice: Subject to any disclaimer, the term of this patent is extended or adjusted under 35 U.S.C. 154(b) by 0 days.

(21) Appl. No.: 10/993,282

(22) Filed: Nov. 19, 2004

(65) Prior Publication Data

US 2006/0111865 A1 May 25, 2006

(51) Int. Cl.
*G01K 7/00* (2006.01)
*H03K 3/00* (2006.01)

(52) U.S. Cl. ........................ 702/130; 702/99; 702/136; 327/512; 327/513

(58) Field of Classification Search .................. 702/99, 702/130, 132, 136, 117; 323/312, 314; 327/512, 327/538, 513; 374/164, 170; 365/189.07
See application file for complete search history.

(56) References Cited

U.S. PATENT DOCUMENTS 4,277,975 A 7/1981 Pinkham
5,532,968 A * 7/1996 Lee ............................ 365/222
5,805,403 A 9/1998 Chemla
5,873,053 A * 2/1999 Pricer et al. ................ 702/130
5,883,550 A 3/1999 Watanabe et al.
6,005,408 A 12/1999 Gillette
6,329,868 B1 * 12/2001 Furman ...................... 327/513
6,789,037 B1 9/2004 Gunther et al.
6,937,087 B1 * 8/2005 Sim et al. ................... 327/512
2002/0022941 A1 2/2002 Yin
2004/0059538 A1 3/2004 Fulton et al.
2004/0162697 A1 8/2004 Smith et al.
2004/0179576 A1 9/2004 Bowden et al.
2004/0204899 A1 10/2004 Gunther et al.
2005/0001670 A1 * 1/2005 Kim et al. .................. 327/512

OTHER PUBLICATIONS

Jim Lepkowski, Temperature Measurement Circuits for Embedded Applications, 2004 Microchip Technology Inc., DS00929A.

* cited by examiner

*Primary Examiner*—Bryan Bui
(74) *Attorney, Agent, or Firm*—Lisa K. Jorgenson; William J. Kubida

(57) ABSTRACT

An on-chip temperature sensor for a semiconductor device. A temperature sensing mechanism includes a first current generator producing a first current that is proportional to absolute temperature of the semiconductor device. A second current generator produces a second current that is inversely proportional to absolute temperature of the semiconductor device. A current mode amplifier is coupled to amplifying the difference between the first current and the second current to produce a temperature signal.

17 Claims, 4 Drawing Sheets

BIAS GENERATOR
BIAS
130
131
PAT CURRENT GENERATOR
VO1
I-PAT CURRENT GENERATOR
VO2
132
133
CURRENT COMPARA-TOR
VTP0
VTP1
VTP2
VTPN
ADC OUTPUT STAGE
TDET0
TDET1
TDET2
TDETN
135
REFERENCE VOLTAGE GENERATOR
VREF
134

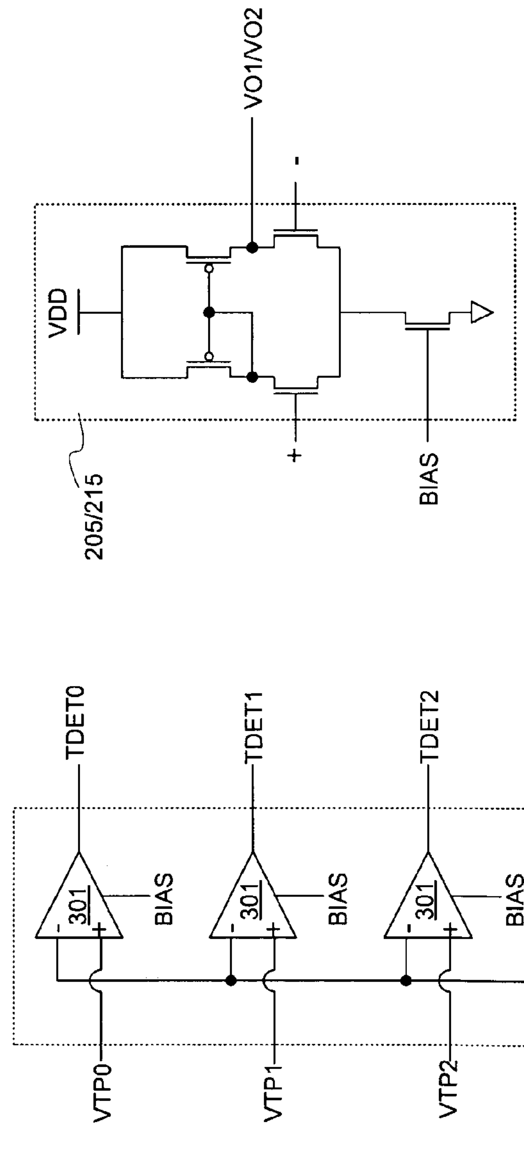
FIG. 3
FIG. 4
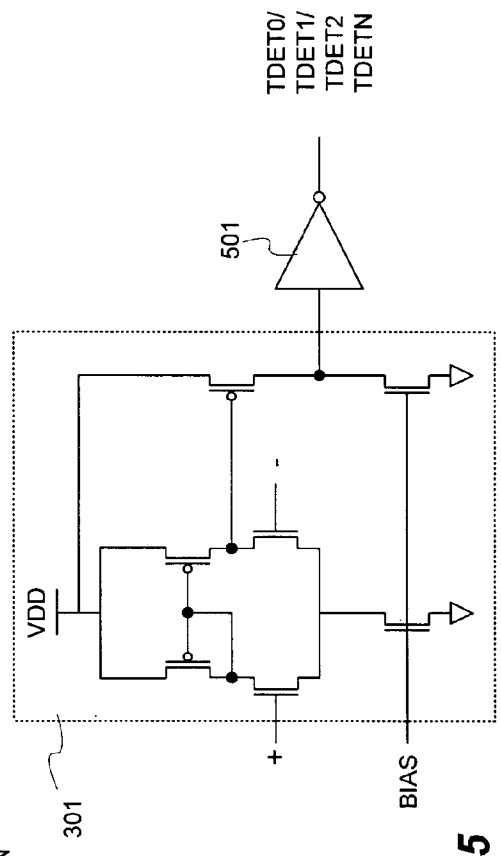
FIG. 5

ON-CHIP TEMPERATURE SENSOR FOR LOW VOLTAGE OPERATION

BACKGROUND OF THE INVENTION

1. Field of the Invention

The present invention relates, in general, to low voltage integrated circuits, and, more particularly, to systems and methods and circuits for implementing an on-chip temperature sensor in low voltage integrated circuits and semiconductor devices.

2. Relevant Background

Thermal performance is becoming an increasingly important characteristic of semiconductor devices such as integrated circuits (ICs). Solid state devices behave differently at different temperatures. Hence, the effects of temperature on integrated circuits and systems can significantly affect the operational characteristics of these circuits and systems. For example, when the on-chip temperature changes the electrical characteristics of the solid state devices change significantly, such as threshold voltage, wiring/contact resistance, electron mobility, and the like. ICs are typically designed to operate in worst-case temperature extremes. Such designs often sacrifice performance at normal operating conditions in order to ensure functionality under the extreme conditions.

A number of circuits and/or functional units in today's electronic devices are temperature sensitive and require accurate and reliable temperature information in order to compensate for temperature variations. For example, the system frequency may be reduced when a certain temperature threshold is reached in order to cause the temperature to be reduced below the critical point. Further, systems, such as portable electronic devices (games, laptops, notebook computers, personal digital assistants), and the like are sensitive to power consumption and may need to shut down all or part of their operations when the power, which is function of temperature, reaches a certain level. Additionally, some individual circuits may need to be disconnected or shut down when the temperature reaches a predetermined level. Self-protection mechanisms, for example, can engage to reduce power consumption and thereby keep the device within safe operating parameters. In other devices it may be desirable to increase or decrease operating frequency to compensate for changes in operating temperature. Also, internally generated voltages used by various subsystems in an IC are sensitive to temperature changes such that performance of those systems can be compromised unless there is some mechanism for compensating for the temperature variation. Accordingly, operating temperature of a semiconductor device such as an integrated circuit (IC) can be measured and used to control operation of the device according to the operating temperature.

As a specific example, the refresh period of a dynamic random access memory (DRAM) device is determined by the leakage current of the memory cells. The leakage current tends to increase as operating temperature increases. Hence, a warm memory device should be refreshed more frequently than a cool memory device. Conversely, the refresh frequency of a cool device can be reduced to save power without compromising data storage integrity.

As the feature sizes of integrated circuits are reduced, the maximum supply voltage these circuits can handle also goes down. While an older 0.7 μm CMOS process could operate at around 5V, a circuit fabricated in 0.18 μm CMOS, for instance, has a typical supply voltage of 1.8V or lower. These lower operating voltage makes the design of analog components, such as a temperature sensor components, more challenging. At lower operating voltages the characteristics of semiconductor devices that are used to fabricate temperature sensing circuits may become more inconsistent. While techniques are known to compensate for this increased variability in digital circuits, temperature sensing relies on analog properties of the semiconductor devices. Accordingly, fabricating stable temperature sensing circuits using low voltages remains problematic.

Hence, a need exists for a temperature sensor, methods for sensing temperature, and systems that incorporate such sensors and implement such methods that provides greater consistency and stability in low-voltage circuits.

SUMMARY OF THE INVENTION

Briefly stated, the present invention involves an on-chip temperature sensor for a semiconductor device. A temperature sensing mechanism includes a first current generator producing a first current that is proportional to absolute temperature of the semiconductor device. A second current generator produces a second current that is inversely proportional to absolute temperature of the semiconductor device. A current mode amplifier is coupled to amplifying the difference between the first current and the second current to produce a temperature signal.

In another aspect, the present invention relates to a method of detecting operating temperature in a semiconductor device. A first current on the semiconductor device is generated that is proportional to absolute temperature of the semiconductor device. A second current is generated on the semiconductor device that is inversely proportional to absolute temperature of the semiconductor device. A difference between the first current and the second current is amplified to produce a temperature signal.

In yet another aspect the present invention involves integrated circuits and electronic systems incorporating an on-chip temperature sensor an implementing a method of detecting operating temperature and operating the integrated circuit and/or electronic system differently in response to the detected operating temperature.

BRIEF DESCRIPTION OF THE DRAWINGS

FIG. 3. illustrates an output stage shown in FIG. 1 in greater detail;

FIG. 4 illustrates an amplifier used in an exemplary embodiment of the present invention;

FIG. 5 shows a amplifier used in an implementation of the output stage shown in FIG. 3;

DETAILED DESCRIPTION OF THE PREFERRED EMBODIMENTS

The present invention is illustrated and described in terms of a temperature sensing system implemented as a component of an integrated circuit, although other implementations are contemplated. In particular examples, the temperature sensing device in accordance with the present invention is implemented as a component of an integrated circuit memory such as a DRAM, which allows the DRAM refresh circuitry to alter its operating mode based on temperature. Other applications of the temperature sensing circuitry, methods and systems will be apparent.

Figure 1:
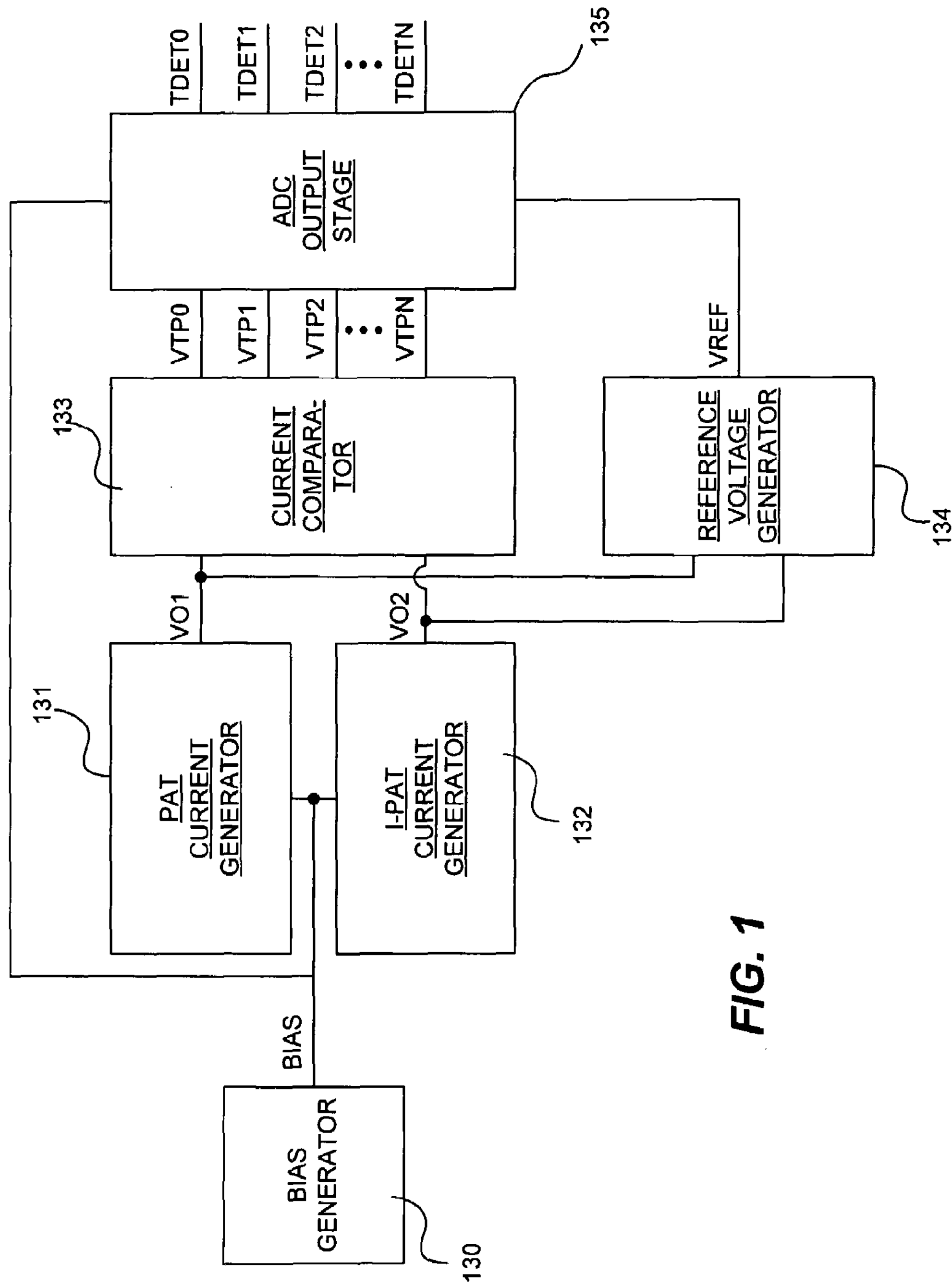
FIG. 1 shows a block diagram of a system in which the present invention is implemented.

In FIG. 1, bias generator 130 provides a bias current to current generator 131, current generator 132, and output stage 135. Bias generator 130 may be implemented using any available circuitry. In operation, current generator 131 generates a current at node VO1 that is proportional to absolute temperature (PAT) whereas current generator 132 generates a current at node VO2 that is inversely proportional to absolute temperature (IPAT). The output of PAT current generator 131 and the output of IPAT current generator 132 are mirrored to current mode amplifier 133. Current mode amplifier 133 comprises one or more current amplification legs that each produces one or more temperature signals (e.g., VTP0, VTP1 and VTP2). Each temperature signal is a function of a difference between the output currents of current generators 130 and 132. One or more binary output signals (e.g., TDET0, TDET1 and TDET2) are generated by comparing the various trip point voltages to a reference voltage VREF that is generated by reference voltage generator 134.

Figure 2:
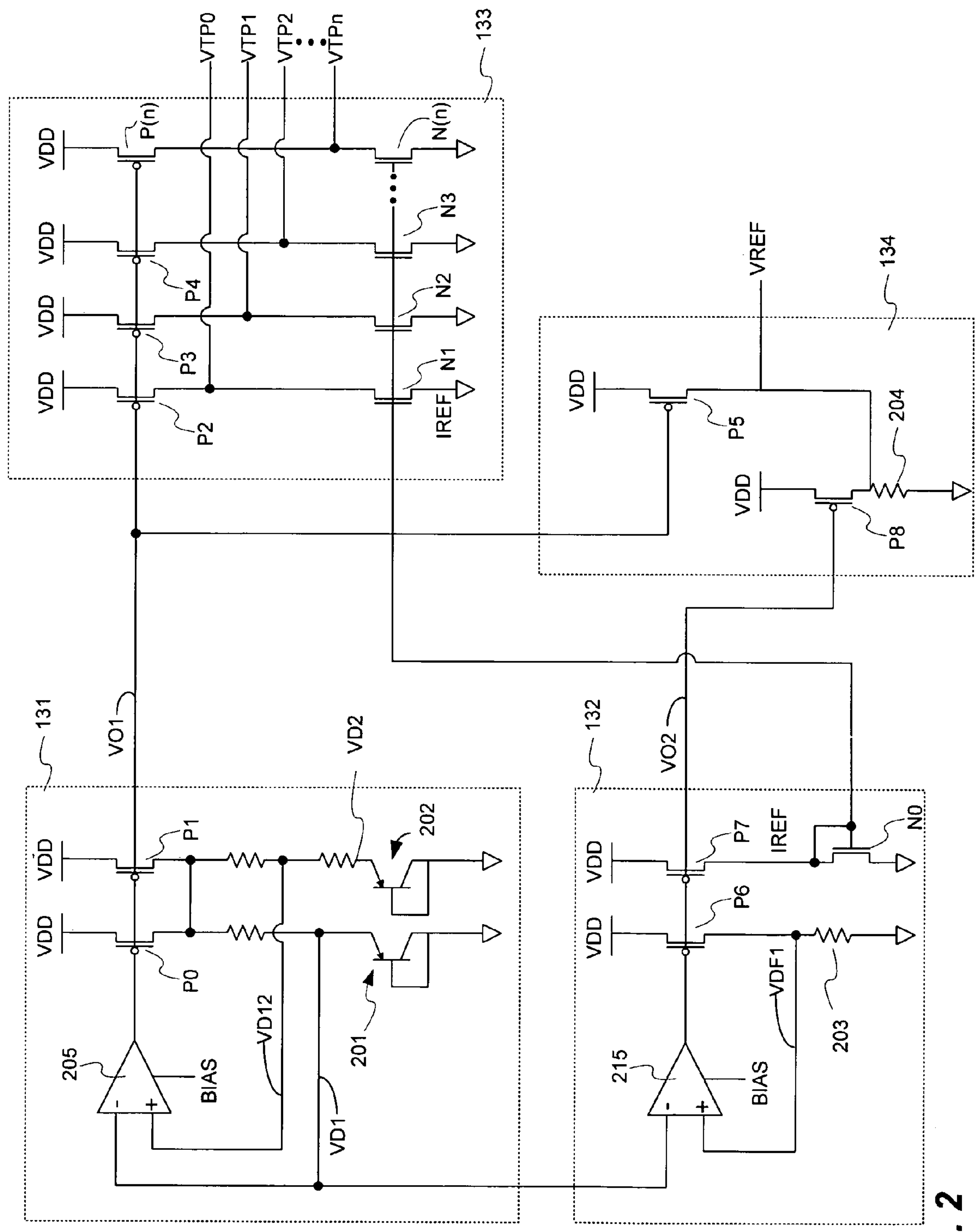
FIG. 2 shows components of FIG. 1 schematically.

As shown in FIG. 2, PAT current generator 131 comprises two current legs driven by an amplifier 205. Each current leg is designed to carry a current that varies with temperature as a result of temperature sensitivity of diode-connected bipolar transistors 201 and 202. In a particular example, the area of bipolar transistor 202 is n-times wider than the area of bipolar transistor 201. The voltage at node VD1 will decrease as temperature increases where the rate of decrease in VD1 is determined by the relative base width of diode-connected transistors 201 and 202. VD1 and VD12 are coupled as two inputs to differential amplifier and so will be held to substantially the same voltage by operation of feedback. As a result, the current through PMOS devices P0 and P1 increases as temperature increases. PMOS devices P2, P3, P4 and P5 have the same gate-source voltages as devices P0 and P1, therefore have the same temperature dependency as PMOS devices P0 and P1.

IPAT current generator 132 includes a differential amplifier 215 having an inverting input coupled to the VD1 node of PAT current generator 131. The voltage VD1 decreases as temperature increases while the voltage at node VDF1 is held to substantially the same value as VD1 by operation of amplifier 215. Accordingly, the current through resistor 203 decreases as temperature increases. As a result, the currents through PMOS devices P6 and P7 decreases as temperature increases as well as the current through NMOS device N0, which is the same as the current through PMOS device P7. Accordingly, the current in NMOS device N0 also decreases as temperature increases. N0 is mirror-coupled to NMOS devices N1, N2 and N3 in differential amplifier 133.

PMOS devices P2, P3, and P4 of current mode amplifier 133 provide currents that increase as temperature increases while NMOS devices N1, N2 and N3 provide current that decrease as temperature increases. Another way of describing this relationship is that PMOS devices P2, P3 and P4 become more conductive as temperature increases whereas NMOS devices N1, N2 and N3 become less conductive as temperature increases. NMOS devices N1, N2 and N3 have different sizes from each other so that the magnitude at which the current/conductivity of the devices changes differs in each leg of current comparator 133. The differential sizing between N1, N2 and N3 is selected to provide the desired "trigger point" temperature (i.e., a particular temperature at which the temperature signal (i.e., VTP0, VTP1, and VTP2) transitions to a state that can be detected by output stage 135. While the implementation shown in FIG. 2 includes three legs which each produce a separate temperature signal VTP0, VTP1 or VTP2, any number of legs may be provided.

Reference voltage generator 134 comprises a PMOS device P5 that is driven by V01 from PAT current generator 131, and PMOS device P8 that is driven by IPAT current generator 132. Current through resistor 204 comprises a sum of the currents through devices P5 and P8 and so is substantially constant over a range of temperatures because of the offsetting effects of the positive and negative temperature coefficients of the currents in P5 and P8, respectively. Hence, VREF, which is the voltage developed across resistor 204, remains substantially constant over a range of temperature.

Figure 7:
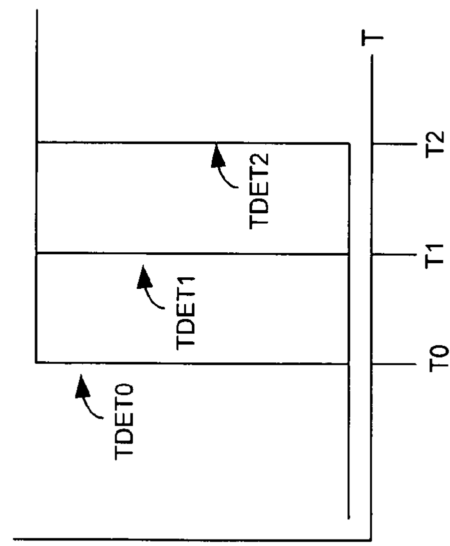
FIG. 7 shows a modeled binary temperature detection signal consistent with the output shown in FIG. 6.
Figure 6:
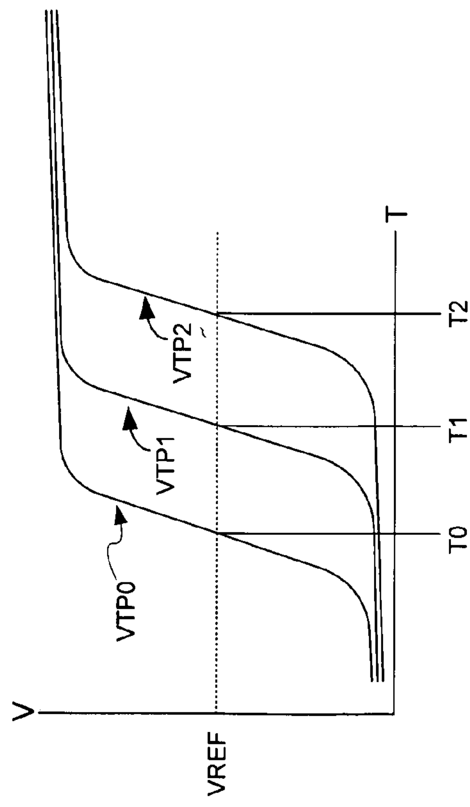
FIG. 6 shows a modeled output curve from intermediate signals generated in accordance with an embodiment of the present invention.

Referring to FIG. 3, output section 135 comprises a plurality of current-mode amplifiers 301 where each amplifier has an inverting input coupled to VREF and a non-inverting input coupled to a particular temperature signal (i.e., VTP0, VTP1, VTP2 . . . VTPn). As the magnitude of the temperature signal VTP becomes greater than the magnitude of the reference VREF, an output (e.g., TDET0, TDET1, TDET2 . . . TDETn) changes state to indicate a particular temperature trigger point has been crossed. FIG. 6 illustrates how the temperature signals will vary with temperature as voltage is shown on the vertical axis and temperature shown on the horizontal axis. It can be seen that VREF, which remains constant across a range of temperatures, is crossed at particular temperatures T0, T1, T2. Referring to FIG. 7, the output signals TDET0, TDET1 and TDET2 transition more abruptly between logic states to when the temperature signal VTP traverses VREF.

While the temperature is lower than a pre-selected temperature T0, the amount of current through PMOS device P3 is smaller than that of NMOS device N1. In this condition, the VTP0 signal is lower than reference voltage VREF. While the temperature is higher than a preselected temperature T0, the amount of current throuhg PMOS device P3 is larger than that of NMOS device N1. In this condition VTP0 is higher than VREF indicating that the temperature is higher than the pre-selected temperature T0. In the same manner, VTP1 is lower than VREF when the temperature is lower than a preselected temperature T1, and higher than VREF when the temperature is higher than the preselected temperature T1.

FIG. 4 shows an implementation of a current mode amplifier suitable for use in amplifiers 205 and 215. The implementation shown in FIG. 3 is a somewhat typical differential amplifier component that is readily implemented in a variety of processes and so is compatible with a variety of integrated circuit designs. FIG. 5 shows an implementation of a comparator suitable for use in comparators 301. In FIG. 5, a current mode amplifier similar to that shown in FIG. 4 is coupled to an inverter formed by a PMOS device coupled in series with an NMOS device. The inverter output is followed by an inverting buffer to produce the binary temperature detection signal TDET0, TDET1, TDET2 . . . TDETn.

The present invention provides a temperature sensing circuit and system that can be readily integrated with a variety of integrated circuits and systems. It is contemplated that the temperature sense signal can be used to improve or optimize the operation of an integrated circuit by controlling device operation differently depending on the temperature or temperature range of the device. For example, a refresh period of a memory device is determined by the leakage current of a memory cell. Usually, this leakage current is larger at high temperatures than it is at lower temperatures. In the past, the refresh period of a memory device must be adjusted to guarantee operation at a worst case condition, i.e., high temperature. In accordance with the present invention, one or more outputs TDET0 . . . TDETn can be used to adjust the refresh rate based on the actual operating temperature or operating temperature range, thereby reducing power loss associated with performing a refresh operation.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method of monitoring temperature in a semiconductor device, the method comprising:

generating a first current on the semiconductor device that is proportional to absolute temperature of the semiconductor device;

generating a second current on the semiconductor device that is inversely proportional to absolute temperature of the semiconductor device;

comparing the difference between a replica of the first current and a replica of the second current at a first amplification factor to produce a first temperature signal; and comparing the difference between a replica of the first current and a replica of the second current at a second amplification factor to produce a second temperature signal.

2. The method of claim 1 further comprising comparing the temperature signals to a reference signal and generating a binary temperature detection signal indicating the results of the comparison.

3. The method of claim 1 further comprising:

comparing the first temperature signal to a reference signal and generating a first binary temperature detection signal indicating the results of the comparison; and comparing the second temperature signal to the reference signal and generating a second binary temperature detection signal indicating the results of the comparison.

4. The method of claim 1 further comprising;

generating a temperature independent reference voltage by combining both the first current and the second current.

5. A semiconductor device implementing the method of claim 1.

6. A semiconductor memory implementing the method of claim 1.

7. The semiconductor memory of claim 6 wherein the refresh rate is determined based at least in part upon the temperature signal.

8. The method of claim 1, wherein the first temperature signal differs from the second temperature signal.

9. The method of claim 8, wherein the difference between the first and second temperatures is achieved through a scaling of transistors used in the comparing of the differences.

10. A temperature sensing mechanism comprising:

a first current generator producing a first current that is proportional to absolute temperature of the semiconductor device;

a second current generator producing a second current that is inversely proportional to absolute temperature of the semiconductor device; and a current-based comparison circuit comprising:

a first comparator stage detecting the difference between of the first current and the second current at a first amplification factor to produce a first temperature signal; and a second comparator stage detecting the difference between the first current and the second current at a second amplification factor to produce a second temperature signal.

11. The temperature sensing mechanism of claim 10 further comprising a comparator operable to compare the temperature signals to a reference signal and generating a binary temperature detection signal indicating the results of the comparison.

12. The temperature sensing mechanism of claim 10 further comprising:

a first comparator operable to compare the first temperature signal to a reference signal and generating a first binary temperature detection signal indicating the results of the comparison; and a comparator operable to compare the second temperature signal to the reference signal and generating a second binary temperature detection signal indicating the results of the comparison.

13. The temperature sensing mechanism of claim 10 further comprising:

a reference voltage generator coupled to the first and second current generators and operable to generate a temperature independent reference voltage by combining both the first current and the second current.

14. The temperature sensing mechanism of claim 10, wherein the first and second comparator stages detect the difference between the first and second currents by detecting differences between currents produced by current mirrors from the first and second currents.

15. The temperature sensing mechanism of claim 14, wherein the current mirrors each are configured with an amplification factor.

16. A method of monitoring temperature in a semiconductor device, comprising:

generating a first voltage with positive temperature coefficient;

generating a second voltage with negative temperature coefficient;

converting the first and second voltages into a plurality of currents using a plurality of first conductivity devices and into a plurality of currents using a plurality of second conductivity devices;

comparing the currents of a first set of the first and the second conductivity devices to determine when a first temperature is reached; and comparing the currents of a second set of the first and the second conductivity devices to determine when a second temperature is reached.

17. A method of monitoring temperature in a semiconductor device, comprising:

generating a first current with positive temperature coefficient;

generating a second current with negative temperature coefficient;

mirroring the first and second currents with first and second current mirrors, wherein outputs of the first and second current mirrors are coupled; and mirroring the first and second currents with third and fourth current mirrors, wherein outputs of the third and fourth current mirrors are coupled;

wherein said outputs are used to detect when predefined temperatures are reached.

* * * * *

UNITED STATES PATENT AND TRADEMARK OFFICE

CERTIFICATE OF CORRECTION

PATENT NO. : 7,127,368 B2
APPLICATION NO. : 10/993282
DATED : October 24, 2006
INVENTOR(S) : Kyun Kyu Choi It is certified that error appears in the above-identified patent and that said Letters Patent is hereby corrected as shown below:

Column 5, line 20, delete "a replica of"

Column 5, line 21, delete "a replica of"

Column 5, line 24, delete "a replica of"

Column 5, line 25, delete "a replica of"

Column 5, line 65, delete "of"

Column 6, line 42, "current-using" should be --current using--

Signed and Sealed this

Sixth Day of March, 2007

JON W. DUDAS
*Director of the United States Patent and Trademark Office*